United States Patent [19]

Dietch

[11] Patent Number: 4,705,357

[45] Date of Patent: Nov. 10, 1987

[54] SHADOW MASK HAVING APERTURE OCCLUSION PREVENTION MEANS

[75] Inventor: Leonard Dietch, Skokie, Ill.

[73] Assignee: Zenith Electronics Corporation, Glenview, Ill.

[21] Appl. No.: 768,522

[22] Filed: Aug. 22, 1985

[51] Int. Cl.[4] ........................ G02B 27/00; G03B 41/00

[52] U.S. Cl. ..................................... 350/322; 350/1.1; 354/1

[58] Field of Search ........................ 350/319, 322, 1.1; 354/1

[56] References Cited

U.S. PATENT DOCUMENTS

| | | | |
|---|---|---|---|
| 3,676,914 | 7/1972 | Fiore . | |
| 3,848,983 | 11/1974 | Fridrich | 354/1 |
| 3,888,777 | 10/1976 | Hosokoshi et al. | 354/1 |
| 3,935,036 | 1/1976 | Kinsch . | |
| 3,954,470 | 5/1976 | Barczynski et al. | 354/1 |
| 4,045,224 | 8/1977 | Yamazaki et al. | 354/1 |
| 4,378,953 | 4/1983 | Winn | 350/1.1 |

*Primary Examiner*—John K. Corbin
*Assistant Examiner*—Loha Ben
*Attorney, Agent, or Firm*—Ralph F. Clarke, Jr.

[57] ABSTRACT

A component-in-process for use in the manufacture of a color cathode ray tube comprises a shadow mask having a pattern of minute apertures for color selection the mask according to the invention has disposed on at least one side thereof a removable film effective to prevent particle occlusion of the apertures. The film according to the invention has an extremely small, substantially uniform thickness dimension, a low index of refraction, and is of such high transparency as to exhibit a negligible optical effect during photoscreening operations. An associated manufacturing method for a cathode ray tube is also disclosed.

8 Claims, 7 Drawing Figures

SHADOW MASK HAVING APERTURE OCCLUSION PREVENTION MEANS

CROSS-REFERENCE TO RELATED APPLICATIONS AND PATENTS

This application is related to but in no way dependent upon copending applications Ser. No. 729,020 filed Apr. 30, 1985, now U.S. Pat. No. 4,652,791; Ser. No. 852,067 filed Apr. 15, 1986, and U.S. Pat. No. 3,676,914, all of common ownership herewith.

Background Of The Invention

The present invention pertains in general to color picture tubes having the shadow mask for color selection. In particular, the invention relates to means for protecting shadow masks during their manufacture, especially those of the high resolution type.

A color cathode ray tube that utilizes the shadow mask typically includes three electron guns arranged in a delta or inline configuration. Each gun projects an electron beam through the assigned apertures of a shadow mask, also called a "color selection electrode," onto a target area on the inner surface of the faceplate. The target area comprises a pattern of phosphor deposits arranged in groups of triads of dots consisting of a dot of a red-, green-, and blue-light-emitting phosphor. To improve the brightness of the display, and to minimize the incidence of color impurities which can result if a beam falls upon an improper phosphor deposit, the target area may include a layer of a darkish light-absorbing material called a "grille" that surrounds and separates each of the dots. This type of screen is known as a "matrix" or "black surround" screen. Alternately, the phosphor and grille deposits on the target surface may comprise a plurality of vertically oriented, spaced rectangles in coordinate relationship to apertures in the form of rectangles or "slots" in the shadow mask. Tubes of this type are referred to as "slot mask tubes," in contrast to the "dot screen" types of tubes.

The phosphor pattern screened on the faceplate, whether dots or stripes, (depending on the type of mask), is typically formed by a direct photoprinting process. The target area is first coated with a photosensitive slurry comprising phosphor particles of one of the three phosphors described. The shadow mask, mounted in a frame, is temporarily installed in precise relationship to the faceplate, and the coating is exposed to actinic light projected through the apertures of the mask from a light source located at a position that corresponds to the beam-emission point of the related electron gun. The faceplate is separated from the shadow mask and the coating is "developed" to remove unexposed portions. The result is a pattern of dots or stripes capable of emitting light of one color, whether red, green or blue. The mask is then re-registered with the faceplate, and the steps are repeated for each of the remaining colors to deposit triads of phosphor deposits on the target area on the faceplate in coordinate relationship with each aperture of the mask. A further step, usually taken before the deposition of the phosphors, is the application of the black surround.

A major problem of the manufacture of the conventional domed shadow mask is that of the plugging of one or more of the 400,000 odd apertures in the mask. Aperture diameter is about six mils and particulate matter in the form of dust floating in the air can settle on the mask surface during production and become embedded in an aperture. Such particles can be dislodged in most cases by blowing air through the apertures, or by vibrating the mask. A particularly pernicious offender is a contaminant in the form of lint which, upon entering the aperture can "hook" itself into the aperture. Lint attached in such a manner is usually immune to dislodgement by forced air or by vibration. A single blocked aperture in the corners of a commercial television tube usually will not be noticed by the viewer; however, if the blocked aperture is near the center of the tube, the omission will be readily apparent and will result in a customer complaint.

In the manufacture of flat-faced high-resolution tubes having the tensed-foil, planar shadow mask, aperture-occlusion is a particularly severe problem. The apertures are smaller in diameter—0.0036 inch—and there may be as many as a million of them. The clogging of even one aperture is cause for rejection of the tube. As a result of this problem, the yield in manufacture can be seriously affected. Clogging that may not be noted with the unaided eye during manufacture can occur at any of the many stages of screening of the target area of the faceplate. For example, the target area may have been successfully screened to receive the black surround and the red and green phosphor deposits. However, a floating particle may lodge in an aperture before the final screening of the target area in which the blue-light-emitting phosphor is to be deposited. The omission of a "blue" phosphor dot will become apparent in the final quality check. As a result, all of the deposits will have to be removed from the target area and the faceplate and panel will have to be recycled through the entire process. The severity of the problem can be comprehended in view of the fact of the high probability of one aperture out of a million being accidentally occluded by a vagrant particle. Unless measures are taken to prevent such aperture occlusion, the manufacturing yield will be prohibitively low.

By way of example, a shadow mask blank for a high-resolution color cathode ray tube typically goes through at least 24 distinct process steps from manufacture until the time of its final installation in the tube envelope. The manufacturing process includes rolling, annealing, forming, screening and perforating. The blanks are processed in near-final form in that they have about one million color selection apertures, plus auxiliary apertures for mounting and trimming. From this stage until the final enclosure in the tube envelope, the blanks are most vulnerable to particle occlusion. The blanks are handled by the mask blank manufacturer during outgoing inspection, and packaging for shipping. When received by the tube manufacturer the blanks go through incoming quality control and are otherwise prepared for installation in the tube. This preparation typically includes the steps of mask pre-tensing and tensing, cement deposition, setting of the cement, cleaning, screening in conjunction with the faceplate—a process which alone takes at least four separate and distinct steps—and finally, installation of the framed mask into the tube and sealing into the tube envelope. At any point during these many procedures, dust and lint can invade to occlude one or more apertures.

In U.S. Pat. No. 3,935,036, Kinsch discloses a method of forming a dark, very adherent coating on the metal of a CRT mask assembly. During manufacture, the coating serves by its adherency to preclude occlusion of the nearby apertures due to flaking of the coating during the screening process. The coating is baked on at about 435 degrees Centigrade. During tube operation, the coating functions both as a heat radiator and an absorber of light which could otherwise reflect from the mask surface and wash out the picture.

Filming compounds for use in manufacture of various coating substrates include anti-static formulations which are usually rolled or sprayed on. A typical application is the use of a gelatin-based anti-static film which is applied to the back surface of a web of drafting film to prevent static build-up as the web is conveyed at high speeds. Other thin film applications include anti-static sprays for lens surfaces. The anti-static additive is typically an optically clear liquid that is enough of an electrical conductor or a surface lubricant to bleed off a static charge. A well-known compound of this type is GAFAC RE-610 manufactured by GAF Corporation.

As used in the semiconductor substrate manufacturing industry, a "pellicle" is a container for enclosing the semiconductor during the screening process. The top of the container comprises an optically clear film having a thickness in terms of microns. The surface of the semiconductor is spaced a predetermined distance from the surface of the film, with the result that during the screening process, any dust particles that fall on the film are effectively outside the depth of field of the lens used in the screening process. The base for the optically clear film may be by way of example, a nitrocellulose or cellulose acetate butyrate.

OBJECTS OF THE INVENTION

It is a general object of the invention to facilitate the manufacture of shadow masks used in color cathode ray tubes.

It is a more specific object of the invention to provide means for increasing the yield in the manufacture of shadow masks for color cathode ray tubes, especially those of the high-resolution type.

It is a specific object of the invention to provide for the resolution of the problem of aperture-clogging during the manufacture of conventional domed shadow masks and tensed-foil planar masks, used in very high resolution cathode ray tubes.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
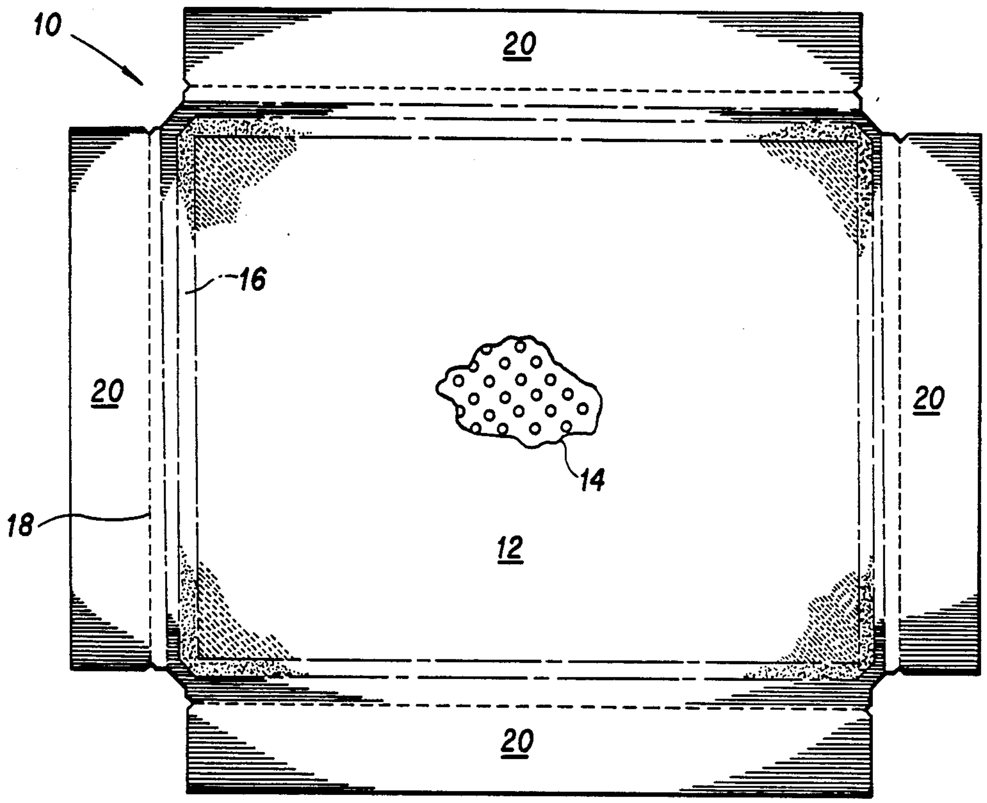
FIG. 1 is a plan view of a tensed foil shadow mask blank described and fully claimed in referent U.S. Pat. No. 4,652,791, the manufacture of which can be facilitated according to the means of the present invention.

With reference to FIG. 1, there is shown a foil shadow mask blank according to the invention fully described and claimed in referent application U.S. Pat. No. 4,652,791, of common ownership herewith. The mask blank 10 shown by FIG. 1 is tensible; that is, it is installed on a frame, typically, under high tension. Mask thickness can be in the range of 0.0003 inch to 0.002 inch, and typically, less than 0.001 inch in thickness. The blank 10 is depicted as having a first field comprising a pattern 12 of minute apertures for color selection. The apertures are indicated as being circular in the enlarged inset 14; the apertures may have a diameter of 0.0035 inch for example. The mask blank also has a second field 16 of apertures, and a third field 18 in which the apertures are peripheral to the first field of apertures 12. The second field of apertures according to the referenced U.S. Pat. No. 4,652,791 provide for receiving cementing means during the assembly of the blank into a cathode ray tube. The third field of apertures 18 comprise tear strips to facilitate tearing of the tabs 20, which are used for tensing the mask, from the blank 10 after the mask tensing operation.

Figure 2:
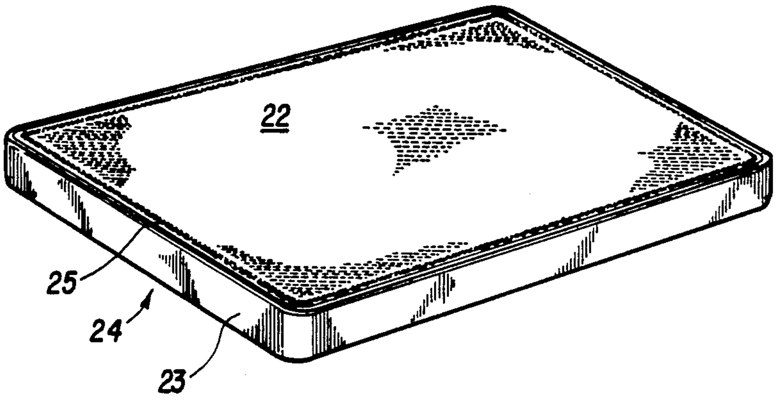
FIG. 2 is an oblique view in perspective of the shadow mask blank depicted by FIG. 1 but mounted in a frame, and which can be processed by the means of the present invention.

In preparation for the screening operation heretofore described, and the assembly of the shadow mask into the cathode ray tube in the final assembly operation, the shadow mask blank 10 is typically mounted on a frame. For purposes of example, a shadow mask 22 is shown by FIG. 2 as being mounted on a simple frame 23 to form a shadow mask assembly 24 preparatory to the production screening process. Shadow mask blank 22 is typically attached to frame 23 by means of a cement such as a devitrifying frit cement 25 forced through the aforedescribed second field of apertures 16 of mask blank 10. Alternately, mask 22 may be welded to frame 23 provided that frame 23 is metallic.

Figure 3:
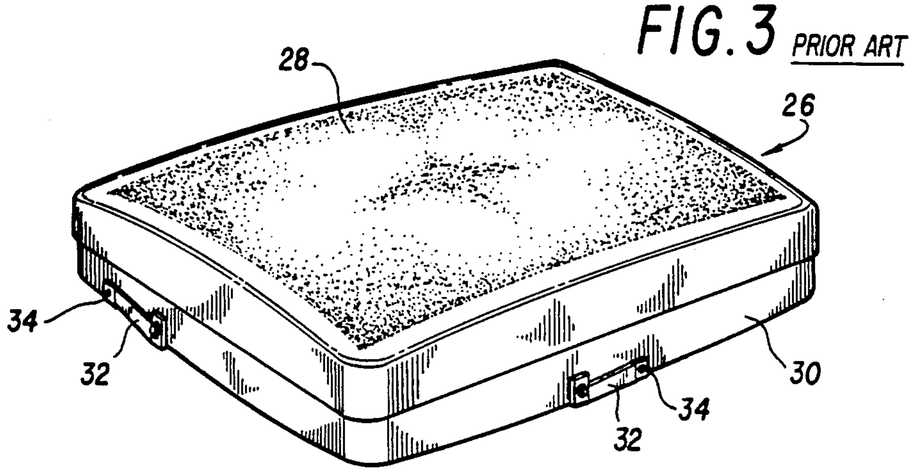
FIG. 3 PRIOR ART
FIG. 3 is an oblique view in perspective of a prior art domed shadow mask which can also be processed by the means of the present invention.

An example of the conventional "domed" shadow mask assembly 26, is depicted by FIG. 3. The mask component 28 is indicated as having a pattern of minute apertures for color selection. The mask, shown as being domed, is depicted as being mounted on a frame 30. Suspension springs 32, usually three in number and identical, are affixed to frame 30 at preselected locations. (Only two are shown in FIG. 3.) Spring apertures 34 located at the distal ends of springs 32 provide for attachment of the shadow mask to studs extending from the inner surface of the rearwardly extending flange of the faceplate (not shown). A domed shadow mask and its manufacture is fully described and claimed in U.S. Pat. No. 3,676,914 to Fiore, of common ownership herewith.

The shadow mask assemblies 24 and 26 shown by FIGS. 2 and 3, respectively, comprise components-in-process according to the invention for use in the manufacture of a color cathode ray tube. A component-in-process according to the invention comprises a shadow mask having a pattern of minute apertures for color selection. The mask has disposed on at least one side thereof a removable film effective to prevent particle occlusion of the apertures. The film according to the invention is characterized by having physically related properties including non-flammability, static charge dispersibility, pyrolyzability and dust rejection. The film according to the invention is further characterized by having optically related properties including an extremely small, substantially uniform thickness dimension of 4 to 6 micro-inches, a low index of refraction, and a high transparency. These optically related properties cause the film to exhibit a negligible optical effect during photoscreening operations.

Figure 4A:
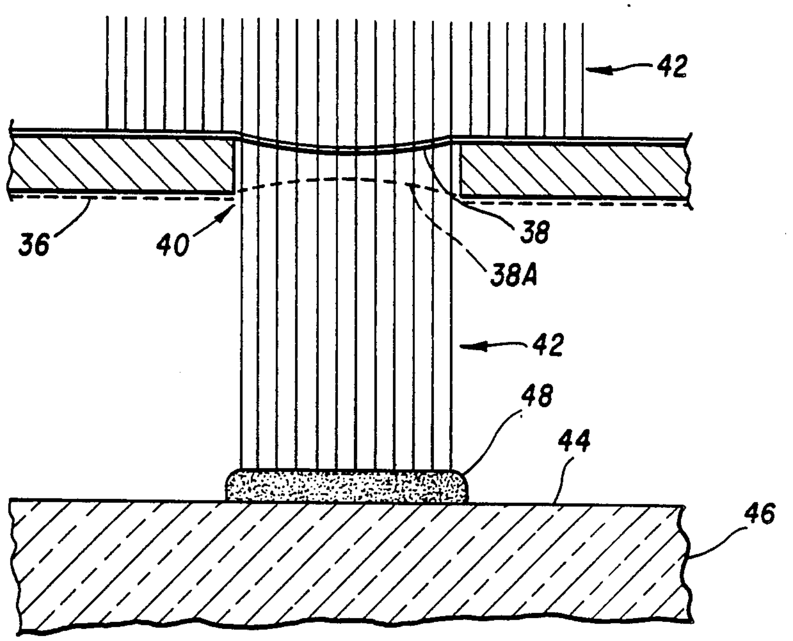
FIG. 4A depicts in elevation and in greatly enlarged form a section of a shadow mask that indicates the configuration of a removable film according to the invention in relation to a single mask aperture.

The removable film according to the invention is depicted to best advantage in FIG. 4A, wherein the film is depicted in greatly enlarged detail in relation to a single aperture of a shadow mask 36, also depicted as greatly enlarged.

The negligible optical effect is indicated highly schematically by the passage of actinic light rays 42 through aperture 40; the passage is considered to be substantially unimpeded. The light rays 42 originate in the lamp of a photoscreening lighthouse (not shown), and pass through the aperture 40, whereafter the rays 42 fall upon the target surface 44 of faceplate 46 to form a dot of phosphor 48 of desired size. The extremely small thickness dimension of the film 38 is, according to the invention, 4 to 6 micro-inches, and typically 5.7 micro-inches (0.147 micron).

The film 38 according to the invention, indicated in FIG. 4A is being deposited on only side of mask 36, may as well be deposited on both sides of the mask; this dual application is indicated by the dotted line representation of the film 38A in FIG. 4A, indicative of being located on the opposite side of mask 36 from film 38.

Figure 4B:
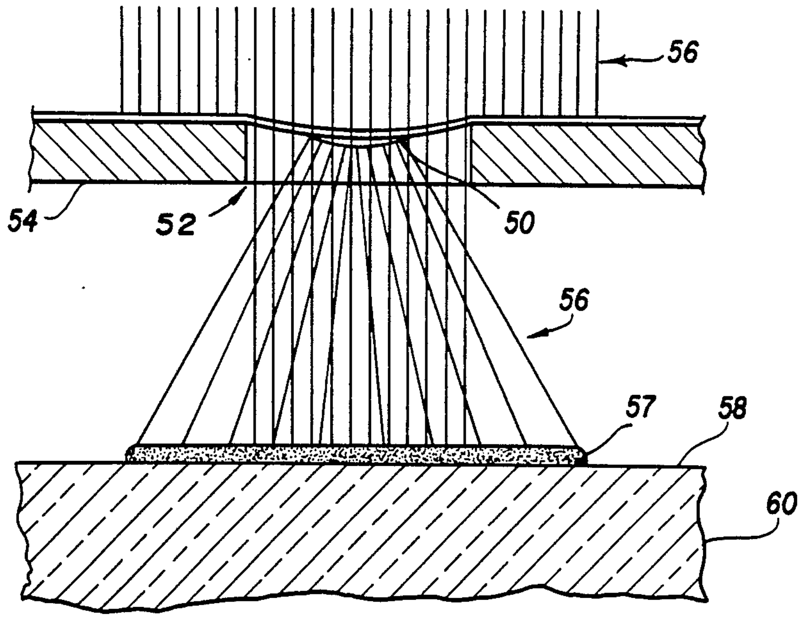
FIG. 4B is an identical view, but depicting a film configuration contrary to the principles of the invention.

An adverse effect is depicted in FIG. 4B wherein the film is so compounded and applied contrary to the principles of the invention as to form a negative meniscus lens 50 in the aperture 52 of shadow mask 54. Light rays 56 are indicated as being diffracted by lens 50, resulting in an undesired expansion in width and a thinning of depth of the phosphor dot 57 deposited on the target surface 58 of the faceplate 60 during the photoscreening process. The greater width of phosphor dot 57 can result in an overlapping of the closely spaced adjacent phosphor dots (not shown), with consequent color impurities. It will also be noted that the dot of phosphor 57 is indicated as being thinner (and hence of lesser luminescence under electron beam bombardment), than dot 48 in FIG. 6, largely as a result of the dispersion of light rays 56 over a wider space of target area 58.

As is well-known in the art, a color cathode ray tube has a shadow mask and a faceplate with a target area for receiving in a photoscreening process at least one pattern of phosphor deposits. A pattern of minute beam-passing apertures of the shadow mask are used during the photoscreening process, and ultimately for color selection during tube operation. The method according to the invention set forth in referent copending application Ser. No. 852,067 for preventing particle occlusion of the apertures during manufacture comprises depositing on at least one side of the mask a removable film prior to the mask-related CRT manufacturing operation which would expose the mask to dust particles. The removable film is characterized by having the physically and optically related properties described heretofore; viz, non-flammability, static charge dispersibility, low index of refraction, et al. The film may be removed by pyrolyzing it.

The filming solution is compounded in liquid form. It is dispensed by pipeting in 0.4 milliliter lots in the process of forming a protective film. The film is disposed on the shadow mask by a novel flotation process. A solution for a film composition for foil shadow mask protection according to the principles of the invention may be compounded as described in the following paragraphs. The recipe will produce 122 milliliters, enough for an average day of production. The amounts can be scaled up as necessary to provide larger quantities. While specific suppliers and their designations are cited, in most cases, equivalent materials available from other suppliers may as well be used.

The solution can be mixed by common means such as magnetic stirring with a stirring bar or a propellor-blade mixer. The materials are added in the order listed while stirring constinuously.

| INGREDIENT | QUANTITY, IN GRAMS | WT. PERCENT PREFERRED RANGE |
|---|---|---|
| Isobutyl isobutyrate | 28.28 | 19–45 |
| Butyl acetate | 28.38 | 50–95 |
| A surfactant based on an aromatic ethoxylate hydrophobic base (GAFAC RE-610) | 0.05 | 0.01–0.10 |
| Dioctyl phthallate | 3.05 | 1–6 |
| A basic binder and film-forming agent selected from a group consisting of nitrocellulose, cellulose acetate butyrate, and cellulose acetate propionate. | 6.09 | 2–12 |

Nitrocellulose, cellulose acetate butyrate, or cellulose acetate propionate provide for the forming of the film for shadow mask protection, and the dioctyl phthallate is a plasticizing agent. GAFAC RE-610 is a surfactant and an anti-static medium. The butyl acetate is a film-spread-enhancing solvent, while the isobutyl isobutyrate is in addition a viscosity stabilizer. Other solvents such as toluene and butyl alcohol may be added in minor substitution to the aforementioned solvents to hasten drying time and/or reduce solvent costs; e.g., displacing the butyl acetate component with butyl alcohol of 10 to 20 weight-percent. Also, the butyl acetate component can be partially displaced with toluene of about 8 to 16 weight percent.

The first and second film-spread-enhancing solvents, that is, butyl acetate and isobutyl isobutyrate are effective to displace dust or other particles that fall on the surface of the water during the process of the flotation-coating of the shadow mask (described hereafter). Any such particles are instantly pushed to one side of the flotation-coating tank and are not deposited on the mask along with the film.

The nitrocellulose, designated 0.5 R.S. nitrocellulose, is a 70% mixture wet with isopropyl alcohol. This and the other film-forming agents are available from Hercules, Inc. of Wilmington, Del., and Eastman Chemical Products, Inc. of Kingsport, Tenn. These materials comprise basic binders and basic film-formers.

The dioctyl phthallate is supplied by Fisher Scientific Company of Pittsburgh, Pennsylvania. The anionic surfactant based on an aromatic ethoxylate hydrophobic base is also defined as a "complex organic phosphate ester, free acid." This can be GAFAC RE-610 supplied by the GAF Corporation, New York, N.Y. The butyl acetate is available from Fisher Scientific. The isobutyl isobutyrate is supplied by Chem Central, Chicago, Ill.

The method for applying a protective film to a conventional domed shadow mask assembly and to a foil shadow mask assembly is described in following paragraphs.

Figure 5:
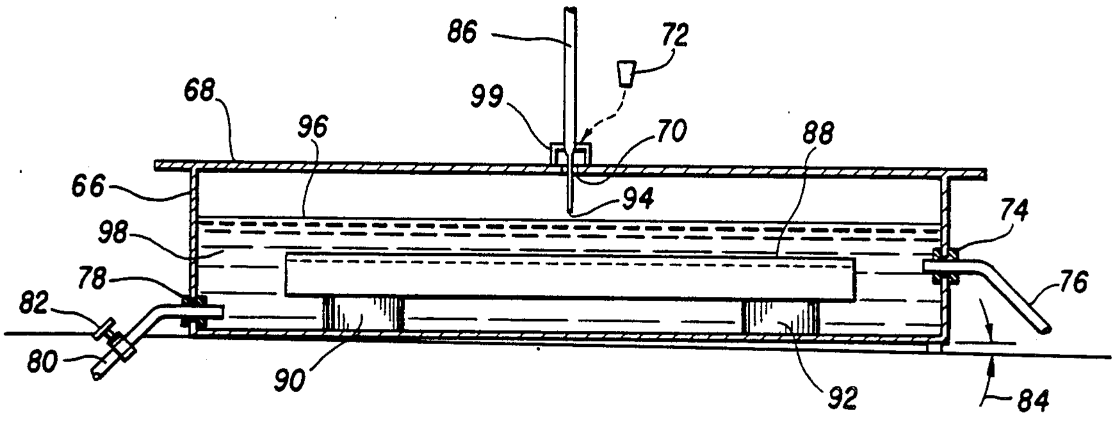
FIG. 5 is a sectional view in elevation showing details of a flotation tank used for application of the means for prevention of aperture occlusion during manufacture of the tensed foil shadow mask depicted in FIG. 2.
Figure 6:
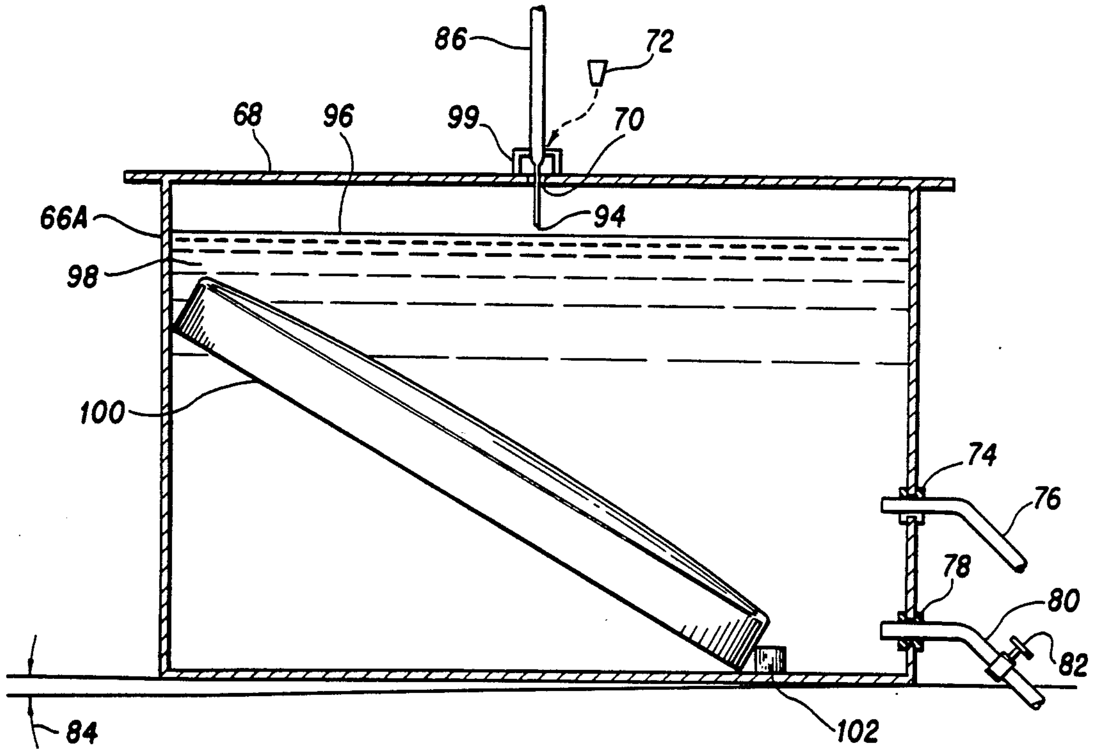
FIG. 6 is a view similar to FIG. 5 of another flotation tank which provides for the application of means to prevent aperture occulsion in the manufacture of the conventional domed shadow mask shown by FIG. 3.

Two types of film-flotation tanks are required; the tank depicted 66 in FIG. 5 provides for filming a tensed foil mask assembly while FIG. 6 depicts a tank 66A for filming a domed shadow mask assembly. As the basic tank components are similar, the same reference numbers are used for identical parts. The only significant difference between the two tanks is that the tank 66A for the domed shadow mask is made deeper to accommodate the mask assembly at an angle, as indicated by FIG. 6.

The flotation tanks 66 and 66A, which are water-tight, are each depicted as having a cover 68 with an access hole 70 in the center thereof fitted with a stopper 72. An inlet connection 74 provides for the admission of a steady flow of deionized water. The inlet connection 74 is preferably a ⅛ inch MPT fitting with a length of tubing 76 attached. This size of inlet connection is recommended as it will admit water at a steady rate without turbulence and with minimum formation of air bubbles. The water outlet connection 78 is also preferably ⅛-inch MPT fitting with a length of tubing 80 attached. A pinch clamp 82 provides for retaining and releasing the water. Please note the tank incline 84 which provides for complete draining of the tanks 66; the preferred draining angle is about 5 degrees. With regard to the height of spacers 90 and 92 in tank 66, they are of a dimension adequate to hold the mask assembly 88 above the bottom of the tank to facilitate draining; i.e., a height of about one-half inch.

A standard long capillary-type pipet 86 provides for applying the filming solution. Pipet 86 is inserted into the hole 70 a precise distance such that the meniscus of the solution formed at the tip 94 of pipet 86 just contacts the surface 96 of the water 98 let into the tanks. A stop 99 controls the depth of entrance of pipet 86 into the tanks; the water level can be controlled with great accuracy by fluid-leveling means well-known in the art. The surface 96 of the water 98 shown by FIGS. 5 and 6 should be about ⅛-inch above the top of the respective mask assembly, leaving about one to one-half inches of free space above the surface 96 of water 98 for inserting of the pipet 86 and the release of the filming solution.

Dimensions of the tanks depend on the size of the mask assembly being filmed according to the invention. For example, tank 66 shown by FIG. 5 is sized to accommodate a 14-inch tensed foil shadow mask positioned "on the flat"; tank dimensions are typically 15 inches square by 3 inches high. Tank 66A shown by FIG. 6 may be about 7 and ¾ inches high by 12 inches wide by 14 inches deep. The wall materials can be ¼-inch Plexiglas(R). Larger mask assemblies will of course require larger tanks. Except for the spacing of the mask assemblies with respect to water level, tank dimensions are not critical.

With regard to mask assembly placement, the tensed foil shadow mask assembly 88 shown by FIG. 5 is preferably positioned foil-side-up. Placement of the domed shadow mask assembly 100 shown by FIG. 6 is depicted as being at an angle, which may be from 30 to 60 degrees. The angle, which is produced by resting the mask assembly 100 against the wall of tank 66A and a stop block 102, as depicted. The mask assembly is positioned so the domed mask is in the "up" position to enable the film to "drape" over the mask as the water is released.

All operations must take place in a Class 100 Clean Room, and rubber gloves and clean room apparel are necessary.

PREPARATION OF THE MASK

1. Using a lint-free cloth, wipe the mask surface gently with a mixture of a mild detergent and tap water.
2. Rinse mask with filtered D.I. (deionized) water.
3. Wipe the mask surface with a 10–20% aqueous solution of oxalic acid to remove surface oxides. (Optional)
4. Rinse the mask with filtered D.I. water.
5. Rinse the mask with filtered acetone to remove the water and any residual organic contaminants.
6. Dry mask with filtered, dry compressed air.
7. Inspect mask for the presence of particles in the apertures. If any apertures are occluded, repeat procedure starting from step 4.

PREPARATION OF FLOTATION TANKS (Refer to FIGS. 5 and 6).

8. Clean all interior components of the tank with isopropanol and rinse with filtered D.I. water. Support the tank on a vibration-free surface.

PLACING THE MASK IN THE TANK

9. With reference to FIG. 5, when filming a tensed-foil mask assembly 88, place the mask foil-side-up in the center of flotation tank 66 on the height spacers 90 and 92. With reference to FIG. 6, when filming a domed shadow mask 100 in tank 66A, place the assembly at an angle against stop 102, as indicated.
10. Replace tank cover 68 with stopper 72 in hole 70 on the top of the tank.
11. Fill the tank slowly through the water inlet 74 in a manner so as to prevent the entrapment of air bubbles on the mask surface. Fill tank to within 1 to 1.5 inches of the cover 68 with filtered D.I. water. Water temperature should be between 24 and 30 degrees centigrade. The mask surface should be covered by about ⅛ inch of water.
12. Allow the water to settle for a few seconds until there are no noticeable surface currents.

APPLYING THE FILMING SOLUTION

13. Fill pipet 86 with 0.4 ml of filming solution, and hold solution in pipet by stoppering end with finger.
14. Remove stopper 72 from tank cover 68.
15. Before inserting pipet 86 into hole 70, dab pipet tip 94 on the surface of the cover 68 near hole 70 to remove any excess solution.
16. Lower pipet 86 through the hole 70 in the cover 68 until tip 94 just reaches, but does not enter, the water surface 96. At this point, remove finger from the pipet. The solution will spread over the water surface, draining pipet 86 through capillary action via the meniscus.
17. Remove pipet 86 and re-insert stopper 72 in cover hole 70.

NOTE

Do not allow solution to drop onto the water surface. Do not allow pipet tip 94 to penetrate the water surface 96.

Do not wiggle or vibrate the pipet 86 while dispensing the solution.

18. Observe the surface film to note the extent of spreading. The film can be easily seen by the presence of interference outer rings immediately after application. Any dust particles on the water surface will be pushed to the sides of the tank as the film expands. As the coating begins to set, Newton's rings will be evident for about 20-50 seconds. After the rings disappear, and after there is a uniform color to the film, the water 98 can be drained. The duration of time required for the coating to set up depends on these factors
    - Water temperature,
    - Solvent compostion of coating,
    - Amount of dead air space between cover and water surface,
    - Cleanliness of water.

The film will set in about one minute or less, depending on the factors noted.
19. Drain the water 98 through the outlet port 74 to allow the film to drape smoothly over the mask. Do not remove cover 68 until the water has drained completely.
20. Remove the tank cover 68 and the mask assembly (88 or 100) from the tank. Stand the mask frame vertically on one corner for a few seconds to drain any residual water.

DRYING AND INSPECTION OF THE MASK ASSEMBLY

21. Dry the mask for 10–15 minutes in an oven set to 60–80 degrees centigrade. Shorter oven times at higher temperatures may also be used, with discretion.
22. Inspect the mask for film coverage by holding the mask at an angle to a light and observing the uniformity of reflectivity of the surface. No islands of non-reflectivity are permitted. Another test is to blow smoke through from the back of the mask to see if smoke penetrates any portion of the mask. A quantitative measure of film integrity can be obtained by viewing the coating through a light-sectioning microscope such as the Zeiss Model 36790.

Dispensed as a liquid, the solution is applied to the shadow mask as a film that will harden by exposure to air via the subsequent evaporation of the solvents therein. When in the hardened state, the film has the beneficial properties summarized in the following paragraphs.

The film as applied to the shadow mask is noted as being removable by pyrolyzation. As a result, when the cathode ray tube envelope is permanently joined in the final frit-sealing operation—a process conducted at a temperature exceeding 400 degrees centigrade—the film will vaporize and dissipate, leaving no residue that could out-gas and contaminate or otherwise poison certain of the tube components upon envelope evacuation. Also, no aperture-occluding residue is left on the shadow mask, nor in its apertures.

With regard to the optically related properties as described, the film is noted as having a negligible optical effect during photoscreening operations. As a result, only about a 10% increase in photoscreening exposure time is required. The film, is of substantially uniform thickness over the entire surface of the shadow mask. Although there may be a slight sagging of the film into the apertures as shown by FIG. 4A there is not evidence of a significant negative meniscus in the form a lens, such as that shown by FIG. 4B.

The film has static charge dispersibility properties and dust is normally rejected. If dust does fall on the hardened film, it can be blown off as the film is durable enough to withstand a fan jet of compressed air at a pressure of about 35 psi.

Most important, the material is non-flammable in its hardened condition: a 20,000-volt electric arc merely perforates the film, and an open flame will burn a hole in the film, but the flame will not propagate. The presence of the compound in the production environment is also non-hazardous: less than one-half a milliliter is dispensed during the flotation-coating process so fuming is minimal, and there is no possibility of fire or respiratory irritation. Finally, the film is slightly flexible so that it will stretch without cracking or crazing as the mask is stretched during necessary tensioning.

While a particular embodiment of the inventive means have been shown and described, it will be apparent to those skilled in the art that changes and modifications may be made in the inventive means and method without departing from the invention in its broader aspects. The aim of the appended claims therefore is to cover all such changes and modifications as fall within the true spirit and scope of the invention.

I claim:

1. For use in the manufacture of a color cathode ray tube, a component-in-process comprising a shadow mask having a pattern of minute apertures for color selection, said mask having deposited on at least one surface thereof a removable film effective to prevent particle occlusion of said apertures.

2. For use in the manufacture of a color cathode ray tube, a component-in-process comprising a shadow mask having a pattern of minute apertures for color selection, said mask having deposited on at least one surface thereof a removable film effective to prevent particle occlusion of said apertures, said film being characterized by having properties including an extremely small, substantially uniform thickness dimension, a low index of refraction, and a high transparency, said properties causing the film to exhibit a negligible optical effect during photoscreening operations.

3. The film according to claim 1 wherein said removable film is pyrolyzable.

4. The film according to claim 1 wherein said thickness dimension is in the range of 4 to 6 micro-inches.

5. The film according to claim 1 wherein said film is deposited on both surfaces of said mask.

6. The film according to claim 1 wherein said film is characterized by having physically-related properties including non-flammability, static charge dispersibility, and dust rejection.

7. For use in the manufacture of a high-resolution color cathode ray tube, a component-in-process comprising a tensible foil shadow mask of less than 1 mil in thickness, and having for color selection a pattern of minute apertures approximately 0.0035 inch in diameter, said mask having deposited on at least one surface thereof a removable film effective to prevent particle occlusion of said apertures, said film being characterized by properties including an extremely small, substantially uniform thickness dimension in the range of 4 to 6 micro-inches, a low index of refraction, and a high transparency said properties causing the film to exhibit a negligible optical effect during photoscreening operations.

8. For use in the manufacture of a color cathode ray tube, a component-in-process comprising a shadow mask having a pattern of minute apertures for color selection, said mask having deposited on both surfaces thereof a removable film effective to prevent particle occlusion of said apertures, said film being characterized by having physically-related properties including non-flammability, static charge dispersibility, pyrolyzability, and dust rejection, said film being further characterized by having optically related properties including an extremely small, substantially uniform thickness dimension of 4 to 6 micro-inches, a low index of refraction, and a high transparency, said optically related properties causing the film to exhibit a negligible optical effect during photoscreening operations.

* * * * *